(12) United States Patent
Turek et al.

(10) Patent No.: US 10,981,755 B2
(45) Date of Patent: Apr. 20, 2021

(54) MONITORING DEVICE FOR A CONVEYOR

(71) Applicant: Otis Elevator Company, Farmington, CT (US)

(72) Inventors: Alexander Turek, Munchendorf (AT); Thomas Illedits, Neufeld an der Leitha (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/692,434

(22) Filed: Nov. 22, 2019

(65) Prior Publication Data
US 2020/0165106 A1 May 28, 2020

(30) Foreign Application Priority Data
Nov. 23, 2018 (EP) .................................... 18208162

(51) Int. Cl.
| | |
|---|---|
| *B66B 25/00* | (2006.01) |
| *B66B 23/16* | (2006.01) |
| *B66B 29/00* | (2006.01) |
| *B65G 23/44* | (2006.01) |
| *B66B 27/00* | (2006.01) |

(52) U.S. Cl.
CPC ............ *B66B 25/006* (2013.01); *B65G 23/44* (2013.01); *B66B 23/16* (2013.01); *B66B 27/00* (2013.01); *B66B 29/00* (2013.01)

(58) Field of Classification Search
CPC ....... B66B 23/16; B66B 25/006; B66B 27/00; B66B 29/00; B66B 29/005; B65G 23/44; B65G 43/02
USPC ............................................. 198/323, 810.04
See application file for complete search history.

(56) References Cited

U.S. PATENT DOCUMENTS

| | | | |
|---|---|---|---|
| 1,682,014 A | 8/1928 | Margles et al. | |
| 4,587,852 A * | 5/1986 | Butler | B65G 43/02 |
| | | | 198/810.04 |
| 5,718,319 A | 2/1998 | Gih | |

(Continued)

FOREIGN PATENT DOCUMENTS

| | | |
|---|---|---|
| CN | 103274283 A | 9/2013 |
| CN | 203593511 U | 5/2014 |

(Continued)

OTHER PUBLICATIONS

ABB Group, "Pull wire emergency stop switch", available at: https://library.e.abb.com/public/22ff41f134904a01af66b7d56e0e93ac/ LineStrong_2TLC010025L0201.pdf, 2017, 10 pages.

(Continued)

*Primary Examiner* — Gene O Crawford
*Assistant Examiner* — Keith R Campbell
(74) *Attorney, Agent, or Firm* — Cantor Colburn LLP

(57) ABSTRACT

Monitoring device (30) for monitoring a drive element (12) of a conveyor (1), in which the drive element (12) extends in a conveyance direction. The monitoring device (30) comprises a mechanism (39) attached to the drive element (12) and configured for mechanically monitoring a distance between two predetermined locations of the drive element (12) spaced apart in the conveyance direction. The monitoring device (30) is further configured for triggering an alarm signal in case the monitored distance exceeds a predetermined limit.

18 Claims, 10 Drawing Sheets

(56) References Cited

U.S. PATENT DOCUMENTS

| | | | |
|---|---|---|---|
| 6,851,546 B2* | 2/2005 | Lodge | G01B 7/046 198/502.1 |
| 6,966,419 B2 | 11/2005 | Tada | |
| 8,191,703 B2* | 6/2012 | Tokhtuev | B65G 43/02 198/810.04 |
| 8,285,494 B2* | 10/2012 | Vozner | G01B 11/14 702/34 |
| 8,387,777 B2* | 3/2013 | Tokhtuev | G01L 5/101 198/502.1 |
| 2005/0189200 A1* | 9/2005 | Hill | G01L 5/102 198/810.04 |
| 2019/0062068 A1* | 2/2019 | Kreisfeld | G05B 1/04 |

FOREIGN PATENT DOCUMENTS

| | | |
|---|---|---|
| CN | 103395679 B | 10/2015 |
| CN | 105731235 A | 7/2016 |
| CN | 105800441 B | 12/2017 |
| CN | 106315379 B | 2/2018 |
| EP | 3196625 A1 | 7/2017 |
| GB | 957272 A | 5/1964 |
| JP | S5410760 * | 1/1979 |
| JP | S5410760 A | 1/1979 |
| JP | 2002241072 A | 8/2002 |
| JP | 2008068960 A | 3/2008 |
| JP | 2009132513 A | 6/2009 |
| JP | 2011057362 A | 3/2011 |
| JP | 4986556 B2 | 7/2012 |
| JP | 2017167132 A | 9/2017 |
| KR | 20010011024 A | 2/2001 |
| WO | 2003093783 A1 | 11/2003 |

OTHER PUBLICATIONS

European Search Report for application EP 18208162.0, dated Jun. 3, 2019, 7 pages.

* cited by examiner

MONITORING DEVICE FOR A CONVEYOR

FOREIGN PRIORITY

This application claims priority to European Patent Application No. 18208162.0, filed Nov. 23, 2018, and all the benefits accruing therefrom under 35 U.S.C. § 119, the contents of which in its entirety are herein incorporated by reference.

BACKGROUND

The invention relates to a monitoring device for a conveyor, in particular a people conveyor. The invention also relates to a conveyor comprising such a monitoring device.

Conveyors, such as people conveyors, usually comprise a plurality of conveyance elements, e.g. pallets or steps, at least some of which are drivingly coupled to at least one drive element, such as a belt or a chain.

It would be beneficial to be able to continuously monitor the at least one drive element for detecting wear or a forthcoming failure, such as a rupture, of the at least one drive element as soon as possible, in order to reduce or even prevent further damage.

BRIEF DESCRIPTION

According to an exemplary embodiment of the invention, a monitoring device for monitoring a drive element of a conveyor, the drive element extending in a (longitudinal) conveyance direction, comprises a mechanism attached to the drive element and configured for mechanically monitoring a distance between two predetermined locations of the drive element spaced apart in the conveyance direction. The monitoring device is further configured for triggering an alarm signal in case the monitored distance exceeds a predetermined limit.

Exemplary embodiments of the invention also include a conveyance mechanism, in particular for a people conveyor, comprising a drive element extending along a conveyance direction, and at least one monitoring device according to an exemplary embodiment of the invention.

Exemplary embodiments of the invention further include conveyors, in particular people conveyors, such as moving walkways or escalators, comprising at least one conveyance mechanism according to an exemplary embodiment of the invention, respectively.

A monitoring device according to an exemplary embodiment of the invention allows reliably detecting elongation of a drive element of a conveyor at an early stage. Thus, wear and/or forthcoming failures, such as a rupture of the at least one drive element, may be detected at an early stage, and further damage may be reduced or even prevented.

A monitoring device according to an exemplary embodiment of the invention is based on a mechanically operating mechanism. It in particular does not include any advanced electronic devices. As a result, it can be implemented at relatively low costs.

A number of optional features are set out in the following. These features may be realized in particular embodiments, alone or in combination with any of the other features.

The monitoring device may comprise at least one longitudinal tension member having a first end and an opposing second end, the at least one longitudinal tension member being configured to extend along the conveyance direction between the two predetermined locations. Such a longitudinal tension member allows detecting elongation of the drive element along the conveyance direction.

The monitoring device may comprise a fixing mechanism configured for fixing the first end of the longitudinal tension member to the drive element so that it is not movable with respect to the drive element along the conveyance direction. The fixing mechanism in particular may comprise an opening allowing an axle attached to the drive element to pass through the fixing mechanism.

The second end of the longitudinal tension member may be fixed to the drive element so that it is movable with respect to the drive element along the conveyance direction. This allows the longitudinal tension member to indicate an elongation of the drive element by moving in the conveyance direction.

The monitoring device may further comprise a biasing element, such as a spring, which is configured for tensioning the longitudinal tension member in the conveyance direction. Tensioning the longitudinal tension member in the conveyance direction allows indicating an elongation of the drive element by movement of the second end of the longitudinal tension member with respect to the drive element.

The monitoring device in particular may comprise a trigger mechanism including a first pivotable element with a first side pivotably mounted to the second end of the longitudinal tension member. The trigger mechanism may further comprise a second pivotable element with a first side pivotably mounted to the drive element. Each of the first and second pivotable elements may comprise a second side, respectively, wherein the second sides of the first and second pivotable elements are pivotably connected with each other.

Such a configuration constitutes a mechanical folding mechanism which transfers a linear motion of the second end of the longitudinal tension member into a pivoting motion, which may be detected more easily and more reliably.

The monitoring device in particular may comprise at least one electrical switch, and at least one of the first and second pivotable elements may be configured for operating the at least one electrical switch for issuing an alarm signal in case the elongation of the drive element exceeds a predetermined limit.

The alarm signal may cause reducing the speed of the drive element or even stopping any further movement of the drive element in order to prevent further damage, such as a complete rupture of the drive element.

Alternatively or additionally, issuing the alarm signal may result in emitting a service request requesting a mechanic to visit the conveyor in order to inspect, repair and/or replace the drive element.

The monitored drive element may be a belt, for example a synthetic belt, in particular a step belt or a pallet belt. The monitored drive element also may be a chain, in particular a pallet chain or a step chain.

The monitored drive element may be equipped with a plurality of fastening elements configured for fastening conveyance elements, such as pallets or steps, to the drive element. In such a configuration, the longitudinal tension member may extend between two adjacent or non-adjacent fastening elements. Fastening elements provide fixing means which are well suited for fixing the ends of the longitudinal tension member to the drive element. Such a configuration is cost-efficient as it avoids the need of providing additional fixing means at the drive element for fixing the longitudinal tension member to the drive element.

The drive element may be an endless drive element including a joint portion at which two ends of the drive element form a joint, and wherein the longitudinal tension member extends across said joint portion in order to allow monitoring the length of the joint portion in the longitudinal direction. The strength of the drive element at the joint portion is reduced compared to other portions of the drive element. As a result, the risk of elongation and/or rupture of the drive element at the joint portion is increased. Therefore, it appears beneficial to use a monitoring device according to an exemplary embodiment of the invention in particular for monitoring the joint portion of the drive element.

The conveyance mechanism may be equipped with at least two monitoring devices, in particular with at least one monitoring device arranged at each lateral side of the drive element. Such a configuration is in particular well suited for detecting asymmetric elongations of the drive element, i.e. elongations which are different on the two lateral sides of the drive element.

A conveyor according to an embodiment of the invention may comprise at least two drive elements extending parallel with each other. Such a configuration provides redundancy and/or splits the driving forces between a plurality of drive elements. Each of the at least two drive elements may be provided with at least one monitoring device according to an exemplary embodiment of the invention.

The at least one drive element may be configured for traveling along a closed loop defining an endless path of the conveyance elements.

The conveyor may be a moving walkway in which the conveyance elements are pallets. The moving walkway may extend horizontally or in an inclined direction.

In an alternative configuration, the conveyor may be an escalator in which the conveyance elements are steps.

DRAWING DESCRIPTION

In the following exemplary embodiments of the invention are described with reference to the enclosed figures.

DETAILED DESCRIPTION

Figure 1:
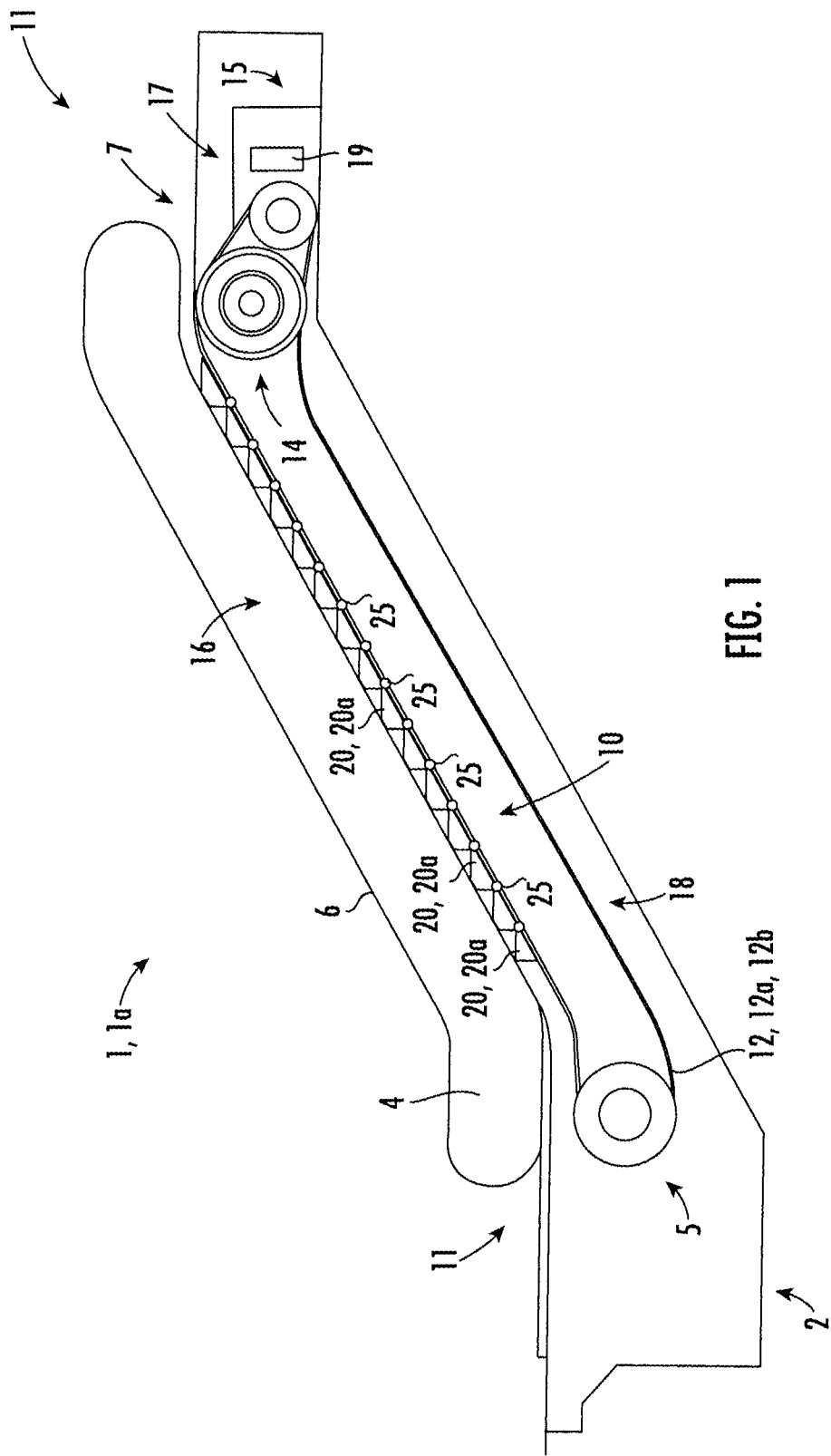
FIG. 1 depicts a schematic side view of a people conveyor, in particular of an escalator.

FIG. 1 depicts a schematic side view of a conveyor 1, in particular a people conveyor in the form of an escalator 1a, comprising a truss 2 and a conveyance band 10. The conveyance band 10 includes a plurality of conveyance elements 20, in particular steps 20a, and extends in a (longitudinal) conveyance direction between two landing portions 11. The conveyance elements 20 comprise rollers 25 guided and supported by guide rails (not shown). For clarity, only some of the conveyance elements 20 are depicted in FIG. 1, and not all conveyance elements 20/rollers 25 are provided with reference signs.

In turnaround portions 5, 7 next to the landing portions 11, the conveyance band 10 passes from an upper conveyance portion 16 into a lower return portion 18, and vice versa.

The conveyance elements 20 are connected to a drive element 12, such as a chain 12a or a belt 12b, extending along a closed loop and configured for driving the conveyance elements 20. The drive element 12 is driven by a conveyance sprocket or sheave 14. A drive 15 including a motor 19 is provided for driving the conveyance sprocket or sheave 14 via a transmission element 17, such as a transmission belt or a transmission chain.

Balustrades 4 supporting moving handrails 6 extend parallel to the conveyance portion 16.

Figure 2:
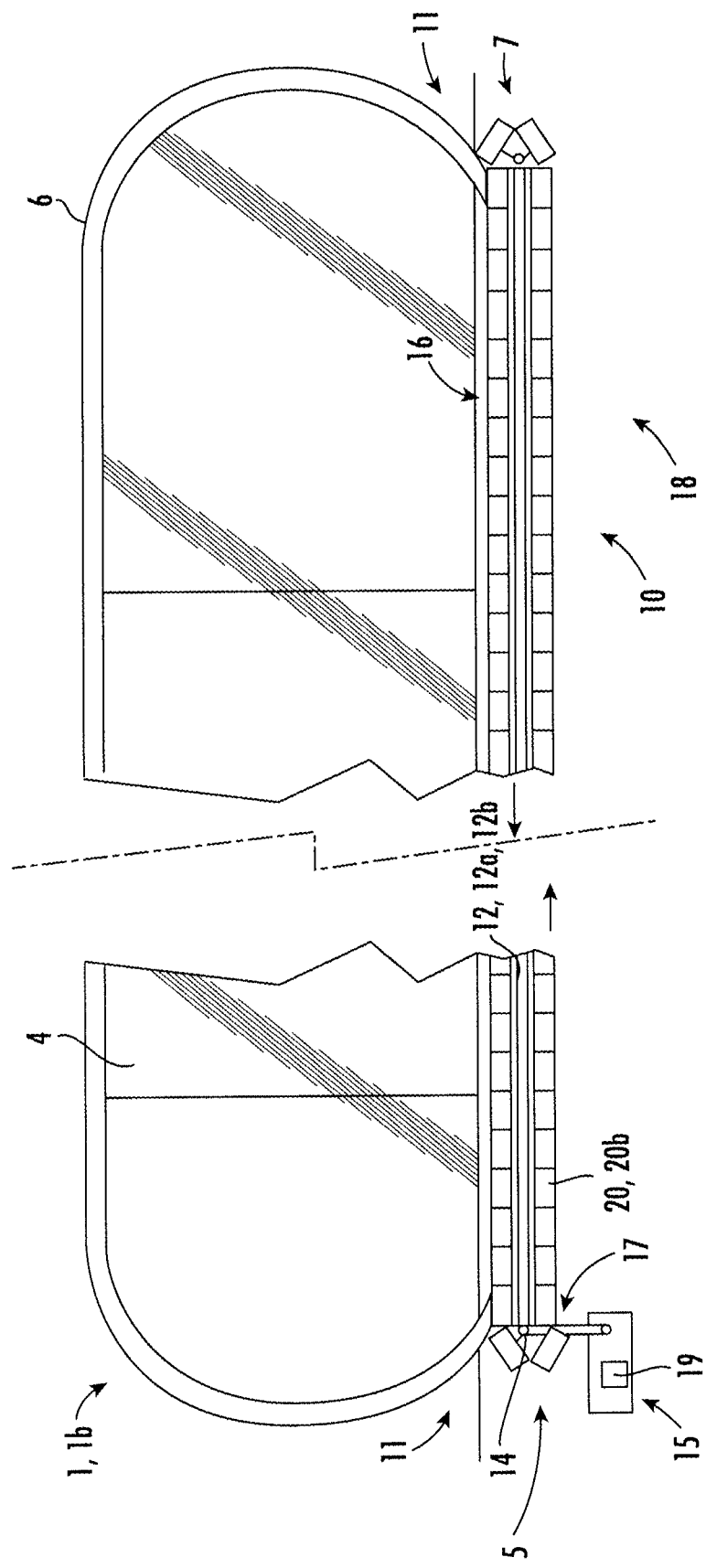
FIG. 2 depicts a schematic side view of another people conveyor, in particular of a moving walkway.

FIG. 2 schematically depicts a schematic side view of another conveyor 1, in particular a people conveyor in the form of a moving walkway 1b.

The moving walkway 1b comprises an endless conveyance band 10 including conveyance elements 20, in particular pallets 20b, moving between two landing portions 11 in a (longitudinal) conveyance direction in an upper conveyance portion 16 and opposite to the conveyance direction in a lower return portion 18. Turnaround portions 5, 7, are provided at both ends of the moving walkway 1b. In the turnaround portions 5, 7 the conveyance band 10 passes from the conveyance portion 16 into the return portion 18, and vice versa.

The conveyance elements 20 are connected to a drive element 12, such as a chain 12a or a belt 12b, extending along a closed loop and configured for driving the conveyance elements 20. The drive element 12 is driven by a conveyance sprocket or sheave 14. A drive 15 including a motor 19 is provided for driving the conveyance sprocket or sheave 14 via a transmission element 17, e.g. a transmission belt or a transmission chain.

Balustrades 4 supporting moving handrails 6 extend parallel to the conveyance portion 16.

Figure 3:
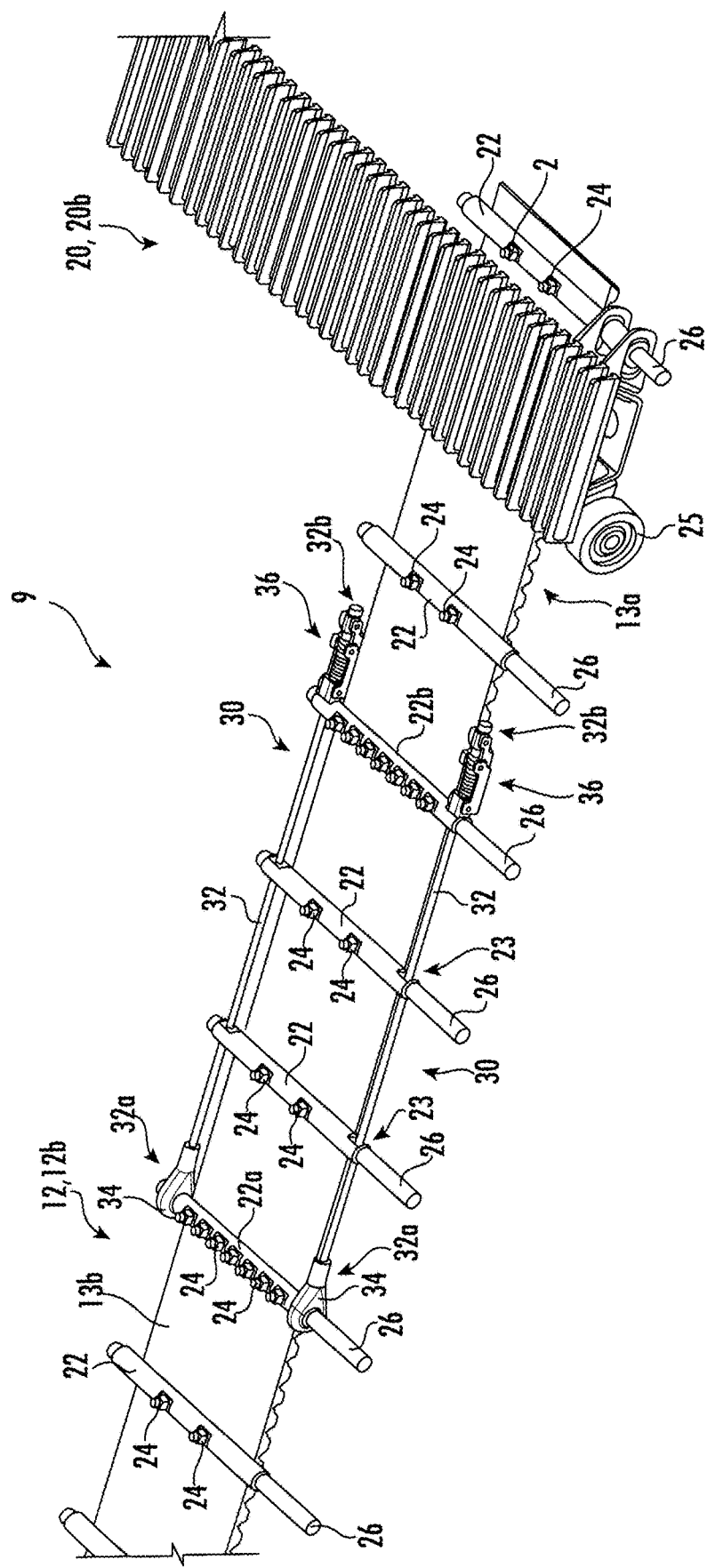
FIGS. 3 and 4 depict perspective views of a portion of a drive element (belt) with a monitoring device according to an exemplary embodiment of the invention.
Figure 4:
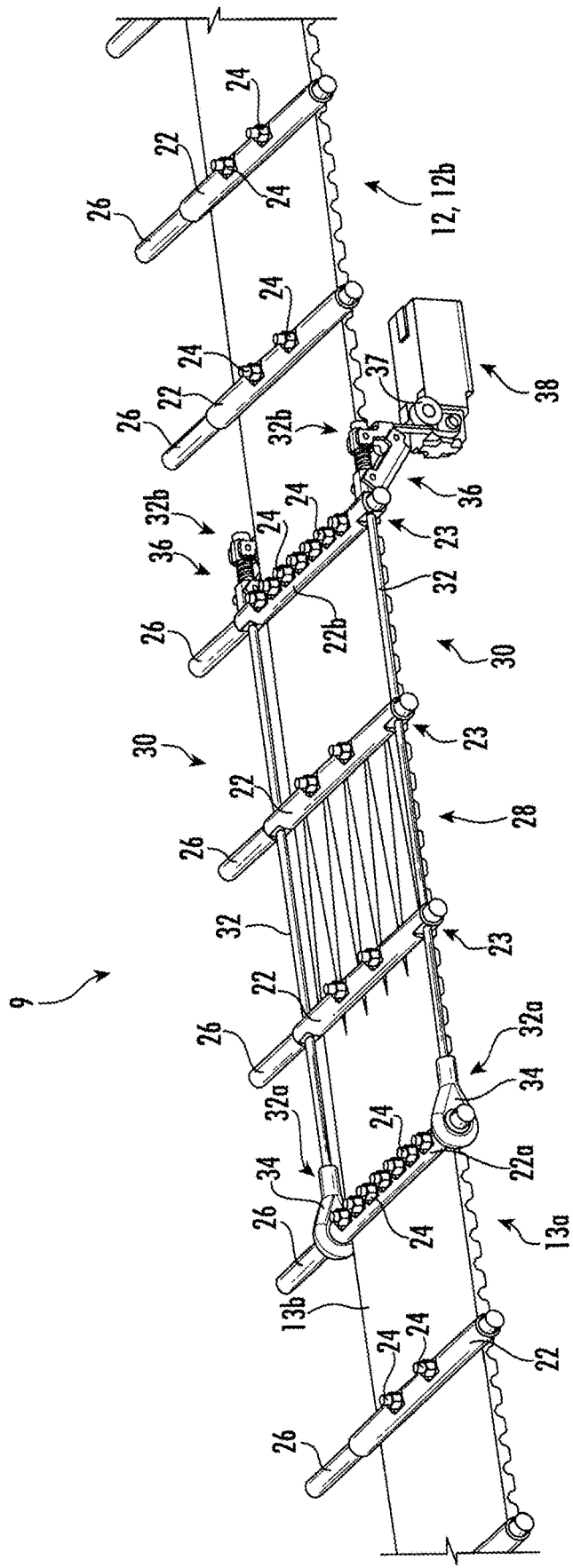

FIGS. 3 and 4 depict perspective views of a portion of a conveyance mechanism 9 which may be employed in a conveyor 1, as it is depicted in FIGS. 1 and 2.

The conveyance mechanism 9 comprises a drive element 12 and two monitoring devices 30 according to exemplary embodiments of the invention.

In the exemplary embodiment depicted in FIGS. 3 and 4, the drive element 12 is a belt 12b, in particular an extruded polymer belt 12b.

FIG. 4 in particular illustrates a joint portion 28 of the belt 12b, in which two former ends of the belt 12b have been joined with each other, e.g. by welding and/or splicing, for forming an endless belt 12b extending along a closed loop. The joint portion 28 for example may have length of approximately 400 mm in the conveyance direction.

The belt 12b comprises a first surface 13a forming the inner surface of the closed loop, and a second surface 13b forming the outer surface of the closed loop.

In the depicted embodiment, the first surface 13a is cogged for engaging with a sheave 14 which is configured for driving the belt 12b (cf. FIG. 1). In alternative embodiments, the belt 12b may be a flat belt or a V-belt.

A plurality of fastening elements 22, 22a, 22b having the form of webs extending orthogonally to the conveyance direction of the belt 12b are attached to the second surface 13b of the belt 12b.

In normal operation, the distances between adjacent fastening elements 22, 22a, 22b are defined by the dimensions of the conveyance elements 20. The fastening elements 22, 22a, 22b in particular are equidistantly spaced apart from each other.

The fastening elements 22, 22a, 22b are fixed to the belt 12b by fixing elements 24, such as bolts or screws, extending through the fastening elements 22, 22a, 22b and the belt 12b. For clarity of the illustration, not all fixing elements 24 are denoted with reference signs in FIGS. 3 and 4.

A conveyance element axle 26 extends through each of the fastening elements 22, 22a, 22b and through corresponding openings formed within the conveyance elements 20 for fixing conveyance elements 20/pallets 20b to the belt 12b (cf. FIG. 3).

Two monitoring devices 30 according to an exemplary embodiment of the invention are depicted in FIGS. 3 and 4, respectively. A monitoring device 30 extending parallel to the belt 12b in the conveyance direction is arranged on each lateral side of the belt 12b.

In the configuration depicted in FIGS. 3 and 4, the two monitoring devices 30 are arranged parallel with each other along the same portion of the belt 12b. However, in alternative configurations, which are not depicted in the figures, two or more monitoring devices 30 may be distributed along the longitudinal direction of the belt 12b. Further, monitoring devices 30 arranged on opposite lateral sides of the belt 12b may be shifted with respect to each other in the longitudinal direction. In other words, two monitoring devices 30 arranged on opposite lateral sides of the belt 12b do not need necessarily to be arranged at the same position along the conveyance direction.

Since the joint portion 28 usually constitutes the weakest portion of the belt 12b, at least one monitoring device 30 in particular may be configured for spanning the joint portion 28 of the belt 12b, as illustrated in FIG. 4, in order to specifically monitor said joint portion 28.

For clarity and simplicity of the description, only a single monitoring device 30 will be described in the following. The skilled person, however, understands that the description applies to any monitoring devices 30 depicted in the figures.

Each monitoring device 30 comprises a longitudinal tension member 32 extending parallel to the belt 12b along the conveyance direction. The longitudinal tension member 32 is flexible so as to be able to move around the turnaround portions 5, 7. The longitudinal tension member 32 is configured for transferring tensional forces in the conveyance direction. The longitudinal tension member 32 may comprise a plurality of chords, in particular a plurality of flexible steel chords.

A first end 32a of the longitudinal tension member 32 (shown as the left end in the figures) is fixed to a first one of the fastening elements 22, 22a, 22b (first fastening element 22a) using a fixing mechanism 34. The fixing mechanism 34 allows rotation around any axis extending orthogonally to the conveyance direction, but it does not allow the first end 32a of the longitudinal tension member 32 to move along the conveyance direction with respect to the first fastening element 22a. The fixing mechanism 34 in particular may comprise an opening configured for accommodating a conveyance element axle 26 extending through the first fastening element 22a.

An opposite second end 32b of the longitudinal tension member 32 (shown as the right end in the figures) is fixed to a second one of the fastening elements 22, 22a, 22b (second fastening element 22b). The second end 32b of the longitudinal tension member 32 in particular is fixed to the second fastening element 22b using a trigger mechanism 36.

The first and second fixing elements 22a, 22b define two predetermined locations of the belt 12b spaced apart in the conveyance direction.

The length of the longitudinal tension member 32 between its first and second ends 32a, 32b corresponds to the distance between the first and second fastening elements 22, 22a plus the length of the trigger mechanism 36 in the conveyance direction.

In the exemplary embodiment depicted in FIGS. 3 and 4, the longitudinal tension member 32 extends in the conveyance direction over a distance corresponding to three distances between adjacent fastening elements 22, 22a, 22b (plus the length of the trigger mechanism 36). This, of course, is only an example, and the skilled person understands that the longitudinal tension member 32 may extend over shorter or longer distances, i.e. over more or fewer fastening elements 22, 22a, 22b. The longitudinal tension member 32 passes though openings 23 formed in the fastening elements 22, 22a, 22b and extending in the conveyance direction.

The trigger mechanism 36 is described in more detail in the following referring to FIGS. 5 to 9.

Figure 5:
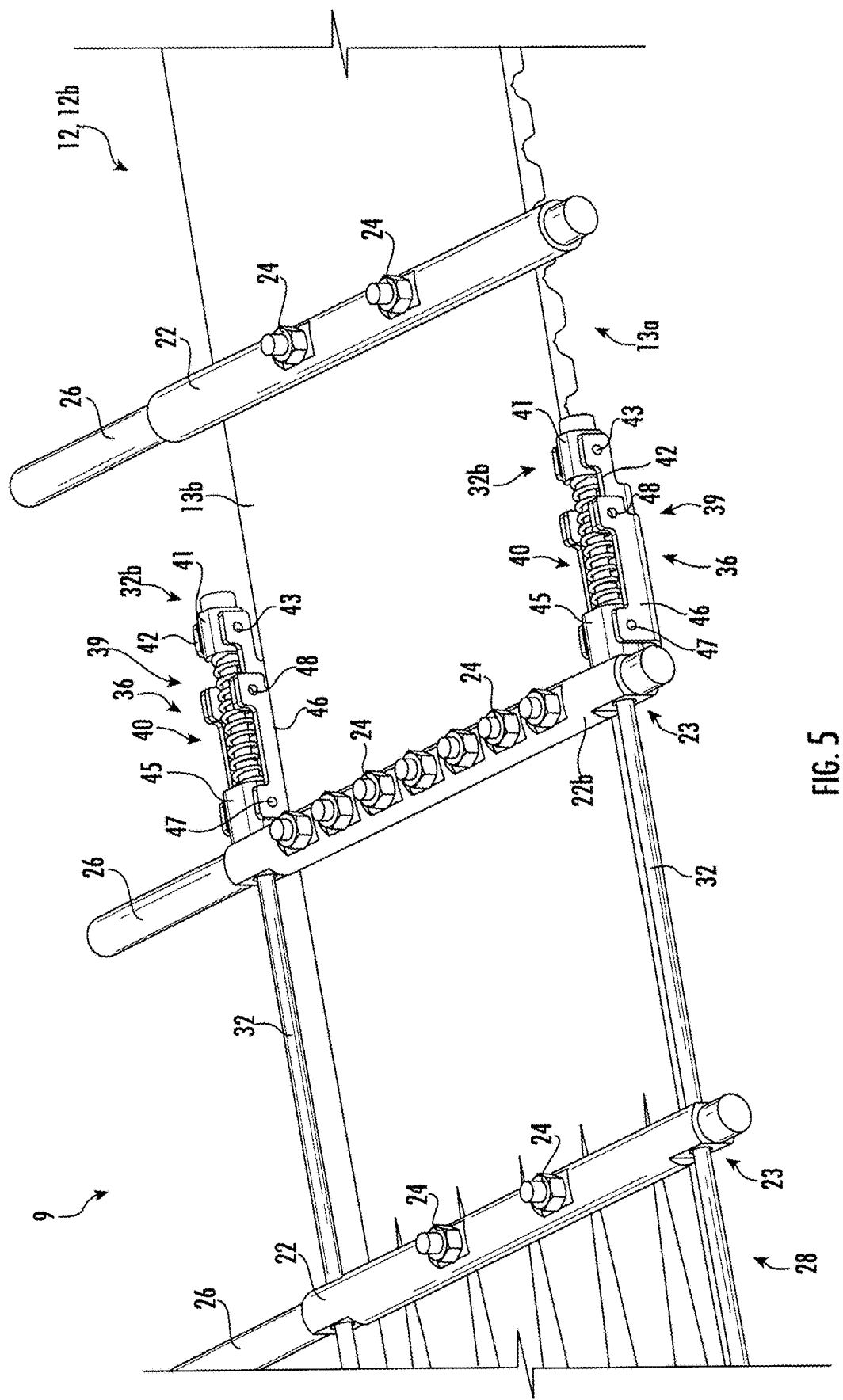
FIGS. 5 and 6 depict perspective views of a trigger mechanism of a monitoring device according to an exemplary embodiment of the invention in a non-activated state.
Figure 6:
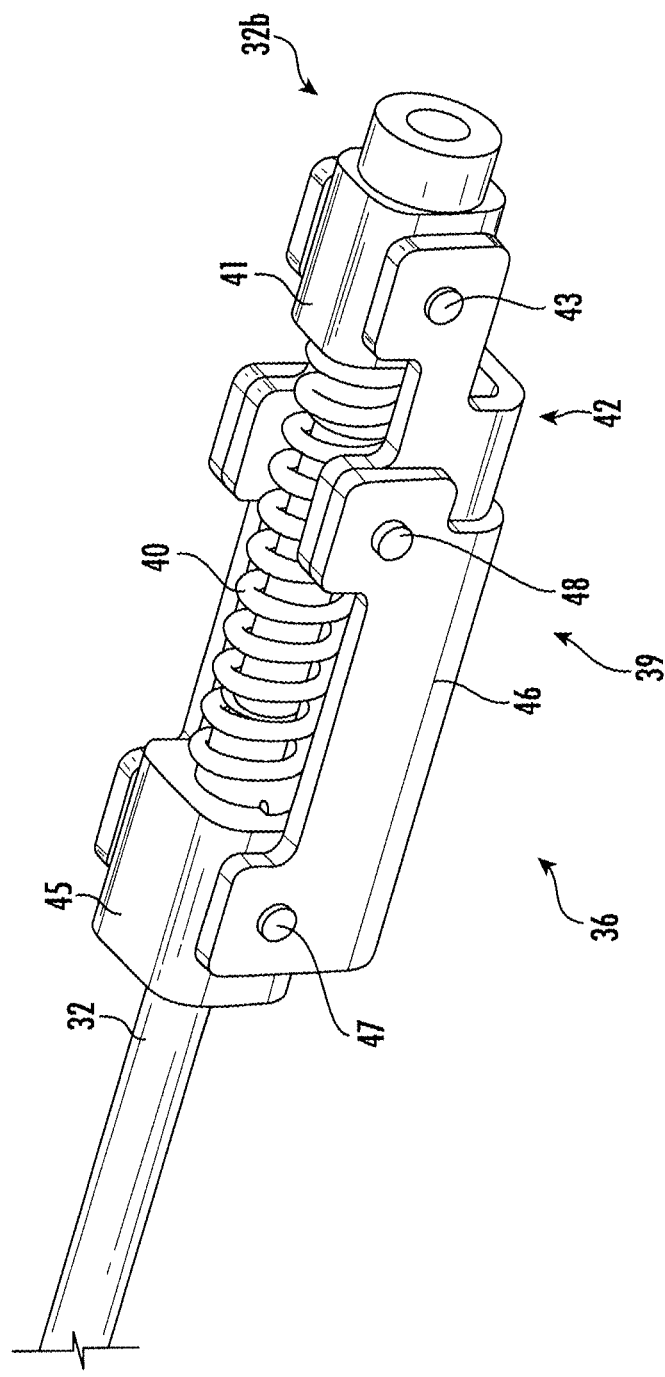
Figure 7:
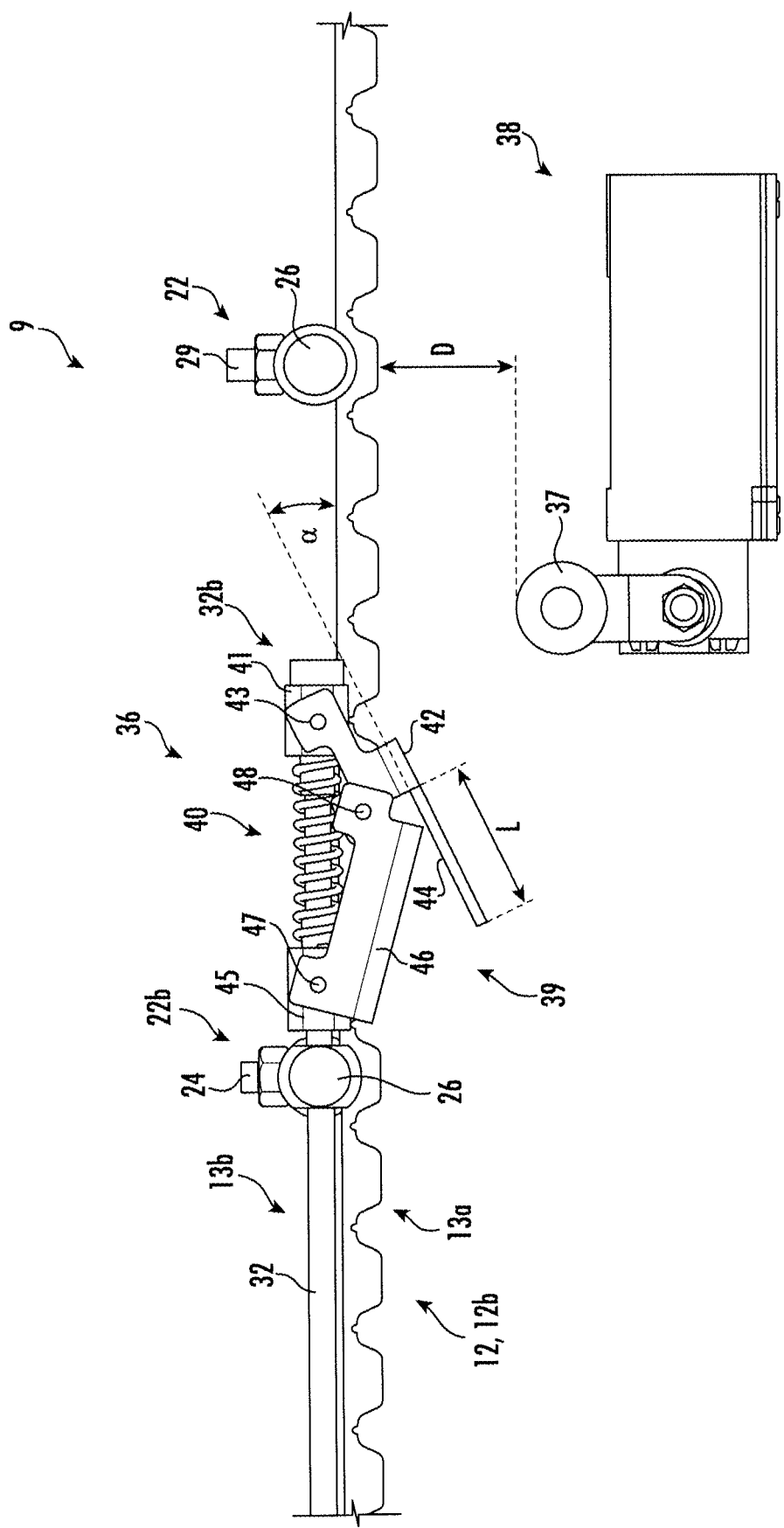
FIG. 7 depicts a side view of a trigger mechanism of a monitoring device according to an exemplary embodiment of the invention in an intermediate state.
Figure 8:
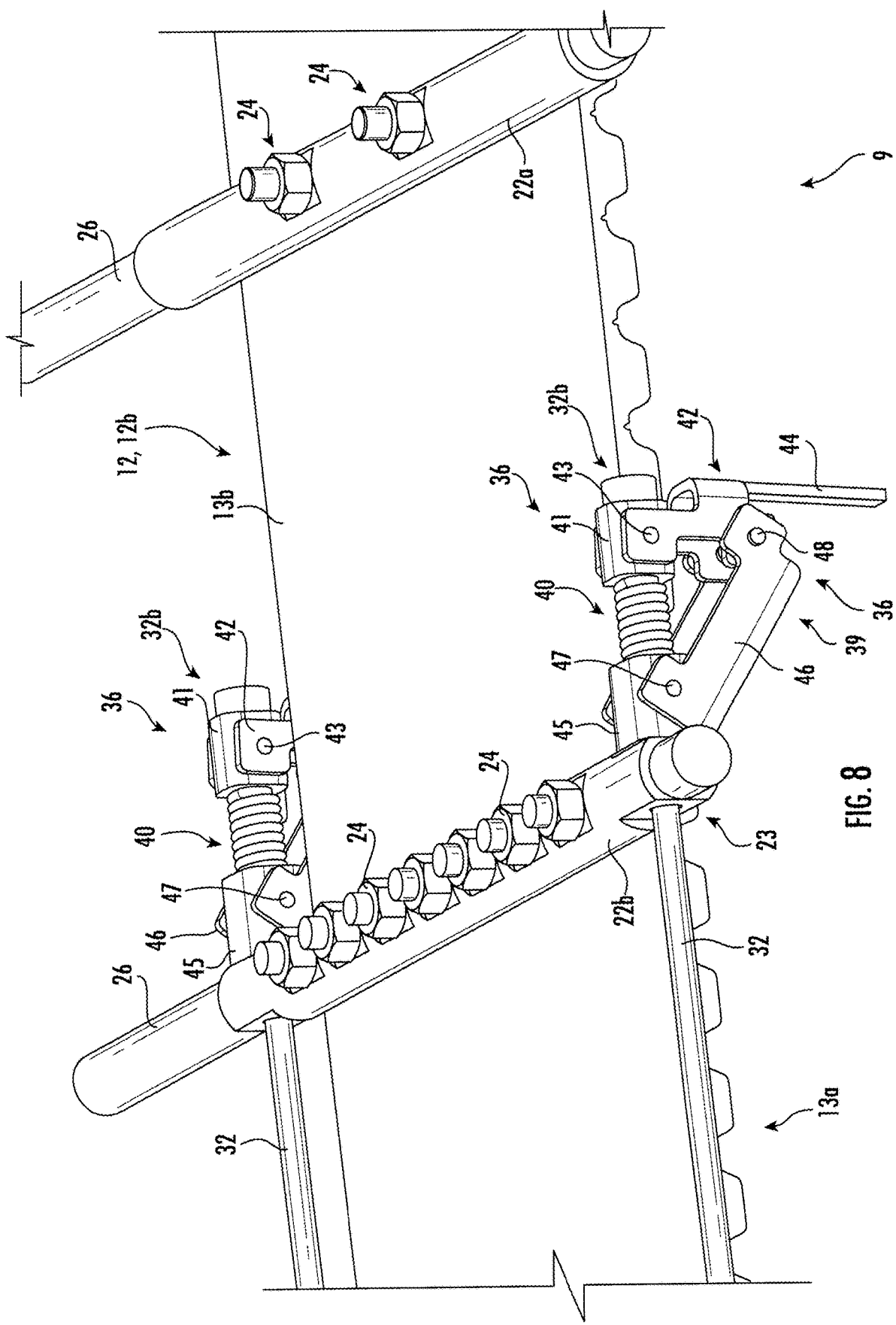
FIGS. 8 and 9 depict perspective views of a trigger mechanism of a monitoring device according to an exemplary embodiment of the invention in an activated state.
Figure 9:
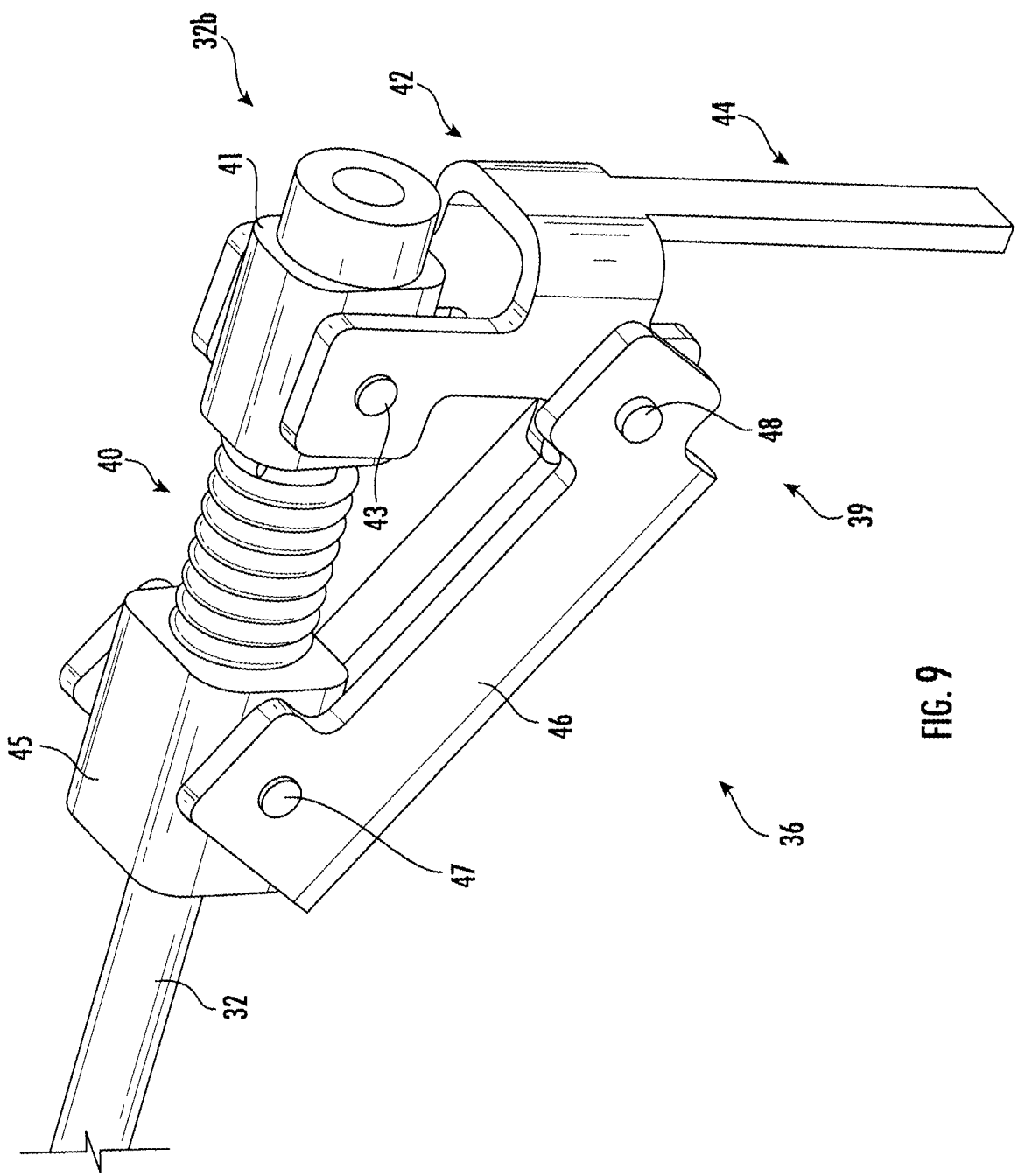

FIGS. 5 and 6 depict enlarged perspective views of the trigger mechanism 36 in a non-activated state, FIG. 7 depicts a side view of the trigger mechanism 36 in an intermediate state, and FIGS. 8 and 9 depict enlarged perspective views of the trigger mechanism 36 in an activated state, respectively.

The trigger mechanism 36 comprises a first pivotable element 42, which is shown on the right side in FIGS. 5 to 9. A first side (the right side in FIGS. 5 to 9) of the first pivotable element 42 is pivotably supported by means of a first axle 43 by a first support element 41. The first support element 41 is fixed to the second end 32b of the longitudinal tension member 32.

The trigger mechanism 36 further comprises a second pivotable element 46, which is shown on the left side in FIGS. 5 to 9. A first side (the left side in FIGS. 5 to 9) of the second pivotable element 46 is pivotably supported by means of a second axle 47 by a second support element 45.

The second support element 45 comprises an opening, which is not visible in the figures. The opening extends in the conveyance direction. The longitudinal tension member 32 extends through said opening allowing the second support element 45 to move along the longitudinal tension member 32.

When the monitoring device 30 is mounted to the belt 12b, as it is depicted in FIGS. 5, 7 and 8, the second support element 45 abuts on the second fastening element 22b blocking movement of the second support element 45 in the conveyance direction (to the left side in the orientation depicted in FIGS. 5, 7 and 8). Optionally, the second support element 45 may be fixed to or formed integrally with the second fastening element 22b.

Second sides of the first and second pivotable elements 42, 46 are pivotably fixed to each other by means of a third axle 48. The first, second and third axles 43, 47. 48 extend parallel with each other.

In consequence, the first and second pivotable elements 42, 46 constitute a mechanism 39, in particular a mechanical folding mechanism, which allows the second support element 45 to move in the conveyance direction along the longitudinal tension member 32 in correspondence with an elongation of the belt 12*b*, thereby changing the distance between the first and second support elements 41, 45 accordingly.

A biasing element 40, such as a spring, in particular a spiral spring, is arranged in between the first and second support elements 41, 45. The biasing element 40 is configured for urging the first support element 41 away from the second support element 45, i.e. for maximizing the distance between the first and second support elements 41, 45 along the conveyance direction.

When the monitoring device 30 is attached to the belt 12*b*, as it is depicted in FIGS. 5, 7 and 8, the movement of the first support element 41 in the longitudinal direction is restricted by the longitudinal tension member 32, and the movement of the second support element 45 in the longitudinal direction is restricted by the second fastening element 22*b* on which it abuts.

As a result, the distance between the first and second support elements 41, 45 varies with the distance between the first fastening element 22*a* to which the first end of the longitudinal tension member 32 is fixed, and the second fastening element 22*b*, on which the second support element 45 abuts (cf. FIGS. 3 and 4).

The length of the longitudinal tension member 32 is set so that in a normal configuration, as depicted in FIGS. 5 and 6, i.e. when the distance between the first and second fastening elements 22*a*, 22*b* has a desired value corresponding to an intact belt 12*b*, the first and second pivotable elements 42, 46 are arranged in alignment with each other extending basically parallel to the surfaces 13*a*, 13*b* of the belt 12*b*.

When a portion of the belt 12*b* in between the first and second fastening elements 22*a*, 22*b* lengthens, the distance between the first and second fastening elements 22*a*, 22*b* increases. As a result, the longitudinal tension member 32 pulls the first support element 41 against the urging elastic force of the biasing element 40 towards the second support element 45 reducing the distance between the first and second support elements 41, 45. Examples of such configurations are depicted in FIGS. 7, 8 and 9.

In order to allow reducing the distance between the first and second support elements 41, 45, the first and second pivotable elements 42, 46 rotate around the first, second, and third axles 43, 47, 48 from a parallel orientation, in which they are oriented basically parallel to plane defined by the belt 12*b* (see FIGS. 5 and 6), into an inclined orientation, in which they protrude from the plane defined by the belt 12*b* (see FIGS. 7, 8 and 9).

In order to ensure that the first and second pivotable elements 42, 46 rotate away from the longitudinal tension member 32 and the biasing element 40 when the distance between the first and second support elements 41, 45 is reduced, the center of the third axle 38 may be arranged outside, in particular below, a virtual line (not shown) extending between the centers of the first and second axles 43, 47. The center of third axle 38 for example may be arranged in a distance of 3 mm from said line.

Alternatively or additionally, the first and second pivotable elements 42, 46 may be arranged in a slightly rotated state, i.e. in a state in which they are not oriented exactly parallel with each other and the longitudinal tension member 32, when the distance between the first and second fastening elements 22*a*, 22*b* has the desired value corresponding to an intact belt 12*b*.

FIGS. 8 and 9 illustrate a final state, in which the first pivotable element 42 extends basically vertically, i.e. orthogonally to the surfaces 13*a*, 13*b* of the belt 12*b*; and FIG. 7 illustrates an intermediate state, in which the first pivotable element 42 is inclined at an angle α of appropriately 25° with respect to the belt 12*b*.

As soon as the elongation of the belt 12*b* exceeds a predetermined limit, a portion of the first pivotable element 42, in particular an optional lever 44 formed at the first pivotable element 42, extends far enough in a direction transverse to the conveyance direction for activating an electrical switch 38 (see FIGS. 4 and 7) arranged next to the belt 12*b* (see FIGS. 4, 7, 8 and 9).

The first pivotable element 42, in particular the lever 44, is moved and pressed against a movable activation element 37, which may be a roller, of the electrical switch 38 when the conveyor 1 is operated moving the belt 12*b* and the monitoring device 30 in the conveyance direction.

The electric switch 38 may be arranged at any position along the conveyance portion 16 or the return portion 18, in particular next to one of the landing portions 5, 7. Optionally, a plurality of electric switches 38 may be arranged along the conveyance portion 16 and/or along the return portion 18, respectively.

The predetermined limit of elongation at which the electric switch 38 is activated, is set by the length L of the lever 44 and by the distance D between the electrical switch 38 and the belt 12*b* in the vertical direction (see FIG. 7), i.e. in the direction oriented orthogonally to the surfaces 13*a*, 13*b* of the belt 12*b*. In an exemplary configuration, an alarm signal is issued as soon as the belt 12*b* is elongated by at least 20 mm. The electrical switch 38 in particular is not activated by small fluctuations of the length of the belt 12*b* as they may be caused by tolerances of the conveyance mechanism 9 or by the fact that the longitudinal tension member 32 moves with respect to the second fastening element 22*b*, especially when passing the turnaround portions 5, 7. Such fluctuations are inevitable, and no sign of the belt 12*b* having an issue.

Activating the electric switch 38 may issue an alarm signal indicating wear and/or predicting a malfunction of the belt 12*b* such as a forthcoming rupture of the joint portion 28 of the belt 12*b*.

Issuing the alarm signal may cause reducing the speed of the belt 12*b* or even stopping any further movement of the belt 12*b* in order to prevent a complete rupture of the belt 12*b*, in particular of the joint portion 28.

Alternatively or additionally, issuing the alarm signal may result in transmitting a service request requesting a mechanic to visit the conveyor 1 in order to inspect, repair and/or replace the belt 12*b*.

A monitoring device 30 according to exemplary embodiments of the invention also may be applied to a drive element 12 provided in the form of a chain 12*a* comprising a plurality of chain links 50 for detecting elongations and/or damages of the chain links 50.

Figure 10:
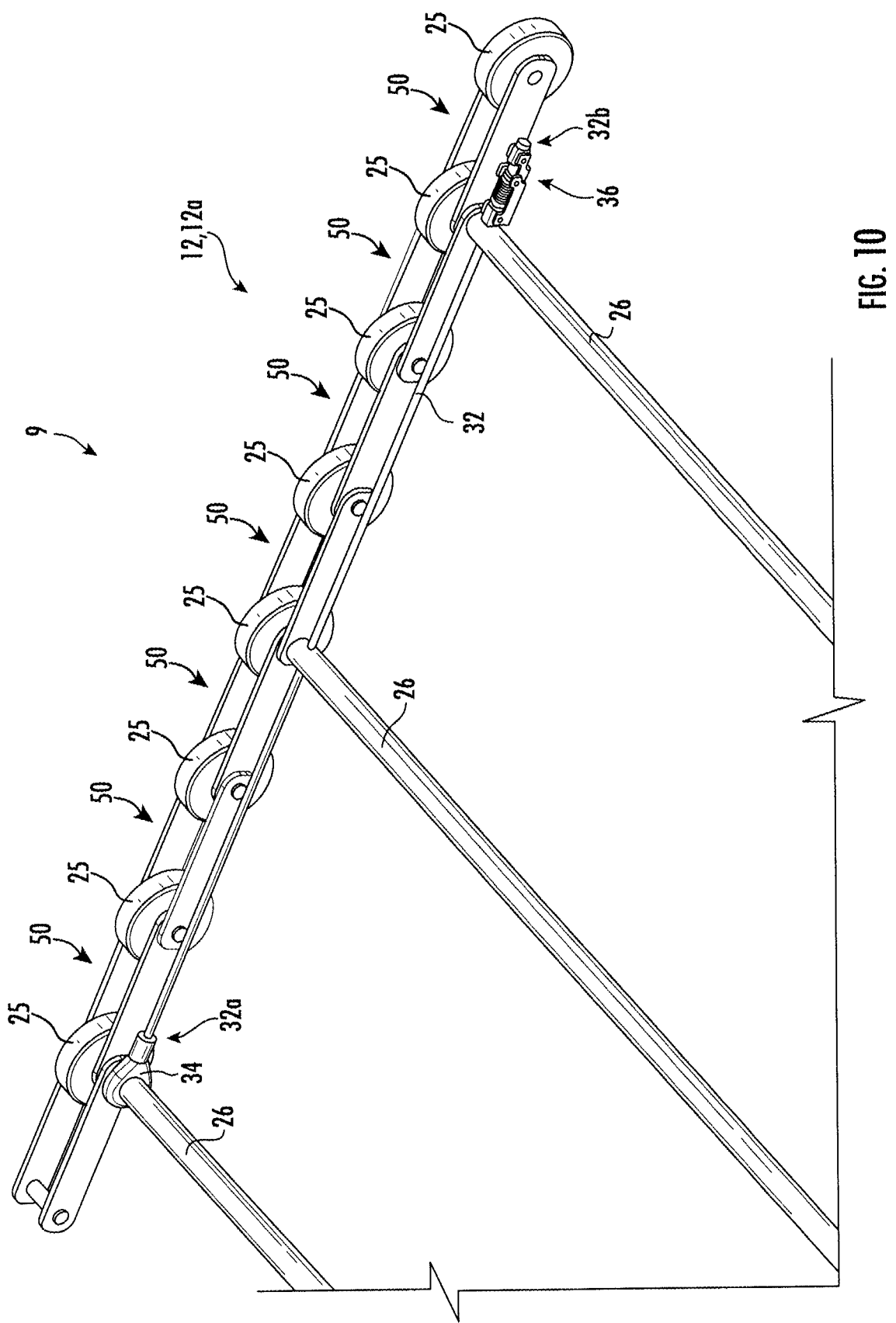
FIG. 10 depicts a perspective view of a portion of a drive element (step chain) with a monitoring device according to an exemplary embodiment of the invention.

FIG. 10 depicts a perspective view of a portion of a conveyance mechanism 9 comprising a chain 12*a*, in particular a step chain 12*a*, and a monitoring device 30 according to an exemplary embodiment of the invention.

In a configuration in which the drive element 12 is a chain 12*a*, the fixing element 34 and the trigger mechanism 36 may be fixed to conveyance element axles (step axles) 26. In the exemplary configuration depicted in FIG. 10, the longitudinal tension member 32 of the monitoring device 30 spans over a length corresponding to the double distance between adjacent conveyance element axles 26 and the length of six chain links 50.

In such a configuration, monitoring devices 30 may be located on both sides of the conveyance elements 20, which are not shown in FIG. 10, in particular between the outer edges of the conveyance elements 20 and the chain 12a.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 conveyor
1a escalator
1b moving walkway
2 truss
4 balustrade
5 turnaround portion
6 handrail
7 turnaround portion
9 conveyance mechanism
10 conveyance band
11 landing portion
12 drive element
12a chain
12b belt
13 first surface
13b second surface
14 sprocket/sheave
15 drive
16 conveyance portion
17 transmission element
18 return portion
19 motor
20 conveyance element
20a step
20b pallet
22 fastening element
22a first fastening element
22b second fastening element
23 opening
24 fixing element
25 roller
26 conveyance element axle
28 joint portion
30 monitoring device
32 longitudinal tension member
32a first end of the longitudinal tension member
32b second end of the longitudinal tension member
36 trigger mechanism
37 activation element
38 electrical switch
39 mechanism
40 biasing element
41 first support element
42 first pivotable element
43 first axle
44 lever
45 second support element
46 second pivotable element
47 second axle
48 third axle
50 chain link α angle between the first pivotable element and the belt
D distance between the electrical switch and the drive element
L length of the lever

What is claimed is:

1. Monitoring device for monitoring a drive element of a conveyor, the drive element extending in a conveyance direction, wherein the monitoring device comprises:
a mechanism attached to the drive element and configured for mechanically monitoring a distance between two predetermined locations of the drive element spaced apart in the conveyance direction, and the monitoring device is configured for triggering an alarm signal in case the monitored distance exceeds a predetermined limit;
wherein the mechanism comprises at least one longitudinal tension member having a first end and an opposing second end, at least one longitudinal tension member configured to extend along the conveyance direction between the two predetermined locations.

2. Monitoring device according to claim 1, comprising a fixing mechanism configured for fixing the first end of the longitudinal tension member to the drive element so that it is not movable with respect to the drive element along the conveyance direction.

3. Monitoring device for monitoring a drive element of a conveyor, the drive element extending in a conveyance direction,
wherein the monitoring device comprises:
a mechanism attached to the drive element and configured for mechanically monitoring a distance between two predetermined locations of the drive element spaced apart in the conveyance direction, and the monitoring device is configured for triggering an alarm signal in case the monitored distance exceeds a predetermined limit;
at least one longitudinal tension member having a first end and an opposing second end, and configured to extend along the conveyance direction between the two predetermined locations;
a fixing mechanism configured for fixing the first end of the longitudinal tension member to the drive element so that it is not movable with respect to the drive element along the conveyance direction;
wherein the second end of the longitudinal tension member is fixed to the drive element so that it is movable with respect to the drive element along the conveyance direction.

4. Monitoring device according to claim 3, further comprising a biasing element configured for tensioning the longitudinal tension member in the conveyance direction.

5. Monitoring device according to claim 3, comprising a trigger mechanism including a first pivotable element having a first side pivotably mounted to the second end of the longitudinal tension member.

6. Monitoring device according to claim 5, wherein the trigger mechanism comprises a second pivotable element having a first side pivotably mounted to the drive element.

7. Monitoring device according to claim 6, wherein each of the first and second pivotable elements comprises a second side, wherein the second sides of the first and second pivotable elements are pivotably connected with each other.

8. Monitoring device according to claim 6, further comprising at least one electrical switch, wherein at least one of the first and second pivotable elements is configured for operating the at least one electrical switch.

9. Conveyance mechanism for a conveyor comprising a drive element extending along a conveyance direction, and at least one monitoring device according to claim 1.

10. Conveyance mechanism according to claim 9, wherein the drive element is a belt or a chain.

11. Conveyance mechanism for a conveyor comprising:
a drive element extending along a conveyance direction;
at least one monitoring device including a mechanism attached to the drive element and configured for mechanically monitoring a distance between two predetermined locations of the drive element spaced apart in the conveyance direction, and the monitoring device is configured for triggering an alarm signal in case the monitored distance exceeds a predetermined limit;
a plurality of fastening elements configured for fastening conveyance elements to the drive element, wherein the at least one longitudinal tension member extends between two of the fastening elements.

12. Conveyance mechanism according to claim 11, wherein the drive element is an endless drive element including a joint portion at which two ends of the drive element form a joint, and wherein the at least one longitudinal tension member extends across said joint portion.

13. Conveyance mechanism according to claim 9, comprising at least two monitoring devices, wherein at least one monitoring device is provided at each lateral side of the drive element, respectively.

14. Conveyor comprising at least one conveyance mechanism according to claim 9.

15. Conveyance mechanism according to claim 10 wherein the belt comprises a synthetic belt.

16. Conveyance mechanism according to claim 10 wherein the belt comprises a pallet belt or a step belt.

17. Conveyance mechanism according to claim 10 wherein the chain comprises a pallet chain or a step chain.

18. Conveyance mechanism according to claim 11 wherein the conveyance elements comprise steps or pallets.

\* \* \* \* \*